US009589239B2

(12) United States Patent
Hadar et al.

(10) Patent No.: US 9,589,239 B2
(45) Date of Patent: Mar. 7, 2017

(54) RECOMMENDING ALTERNATIVES FOR PROVIDING A SERVICE

(75) Inventors: Eitan Hadar, Nesher (IL); Jason Davis, Bristol (GB)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 12/943,125

(22) Filed: Nov. 10, 2010

(65) Prior Publication Data
US 2012/0116747 A1     May 10, 2012

(51) Int. Cl.
*G06Q 10/00* (2012.01)
*G06Q 10/06* (2012.01)
*H04L 12/24* (2006.01)

(52) U.S. Cl.
CPC ....... *G06Q 10/00* (2013.01); *G06Q 10/06312* (2013.01); *H04L 41/5009* (2013.01)

(58) Field of Classification Search
CPC .................... G06Q 30/0201; G06Q 10/06312
See application file for complete search history.

(56) References Cited

U.S. PATENT DOCUMENTS

| 2005/0222819 A1* | 10/2005 | Boss .................. G06Q 10/06 702/186 |
| 2006/0015597 A1* | 1/2006 | Scott .................. H04L 41/0631 709/223 |
| 2008/0046266 A1* | 2/2008 | Gudipalley et al. .............. 705/1 |
| 2010/0185489 A1* | 7/2010 | Satyavolu ............ G06Q 10/063 705/7.38 |
| 2011/0137776 A1* | 6/2011 | Goad et al. .................... 705/34 |
| 2011/0238587 A1* | 9/2011 | Owens, Jr. ............. G06Q 30/01 705/317 |
| 2012/0005189 A1* | 1/2012 | Yu .................... G06F 17/30463 707/718 |

OTHER PUBLICATIONS

U.S. Appl. No. 12/553,416 entitled "*System and Method for Performing Complex Event Processing*", inventors Ethan Hadar et al., 38 pages, filed Sep. 3, 2009.
U.S. Appl. No. 12/728,616 entitled "*Hybrid Software Component and Service Catalog*", inventor Ethan Hadar et al., 35 pages, filed Mar. 22, 2010.

* cited by examiner

*Primary Examiner* — Matthew Gart
*Assistant Examiner* — Amanda Gurski
(74) *Attorney, Agent, or Firm* — Baker Botts L.L.P.

(57) ABSTRACT

In certain embodiments, one or more current service elements that can provide a service for a client are monitored. An event associated with a current service element is detected. One or more candidate service elements are analyzed with respect to the one or more current service elements operating for the client. The one or more candidate service elements operate in a client scenario corresponding to the client. A recommendation is provided in response to the analysis.

19 Claims, 2 Drawing Sheets ical field of computer systems and more specifically to recommending alternatives for providing a service.

BACKGROUND

Service providers may provide services to a client. Services may include, for example, information technology (IT) services. In certain cases, the services may be provided according to a service level agreement. The services may be monitored in order to determine whether the services are being provided according to the service level agreement.

SUMMARY OF THE DISCLOSURE

In accordance with the present invention, disadvantages and problems associated with previous techniques for providing service elements may be reduced or eliminated.

In certain embodiments, one or more current service elements that can provide a service for a client are monitored. An event associated with a current service element is detected. One or more candidate service elements are analyzed with respect to the one or more current service elements operating for the client. The one or more candidate service elements operate in a client scenario corresponding to the client. A recommendation is provided in response to the analysis.

Certain embodiments of the invention may provide one or more technical advantages. A technical advantage of certain embodiments may be that candidate service elements that provide a service may be recommended to replace current service elements that can provide the service for a client. In the embodiments, the candidate service elements may be evaluated with respect to the current service elements. Another technical advantage of certain embodiments may be that performance of the candidate service elements operating for the client may be simulated. Another technical advantage of certain embodiments may be that service providers may be monitored to discover candidate service elements that may replace the current service elements.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
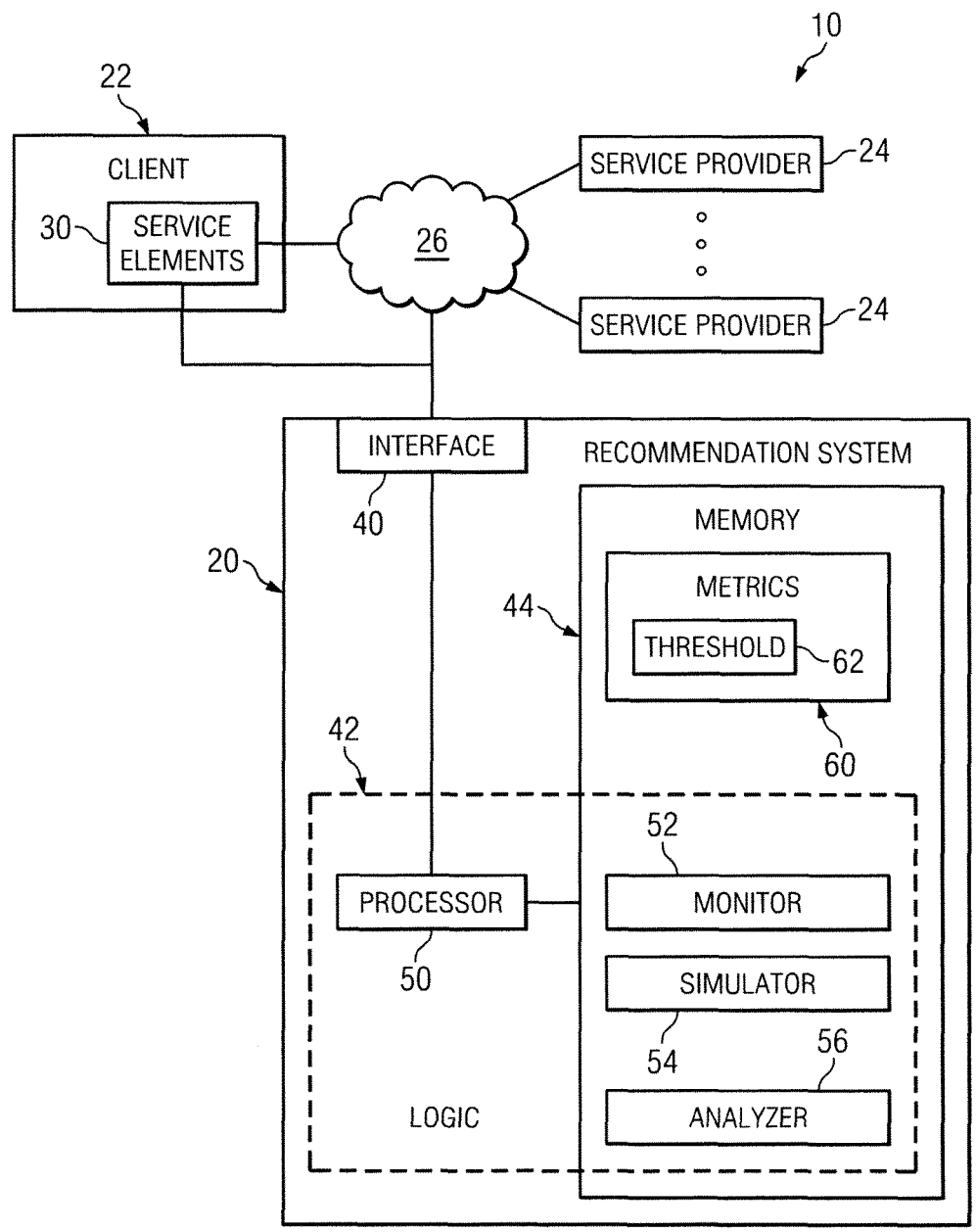
FIG. 1 illustrates an example of a system that includes a recommendation system that may recommend candidate service elements that provide a service to replace current service elements that provide the service.
Figure 2:
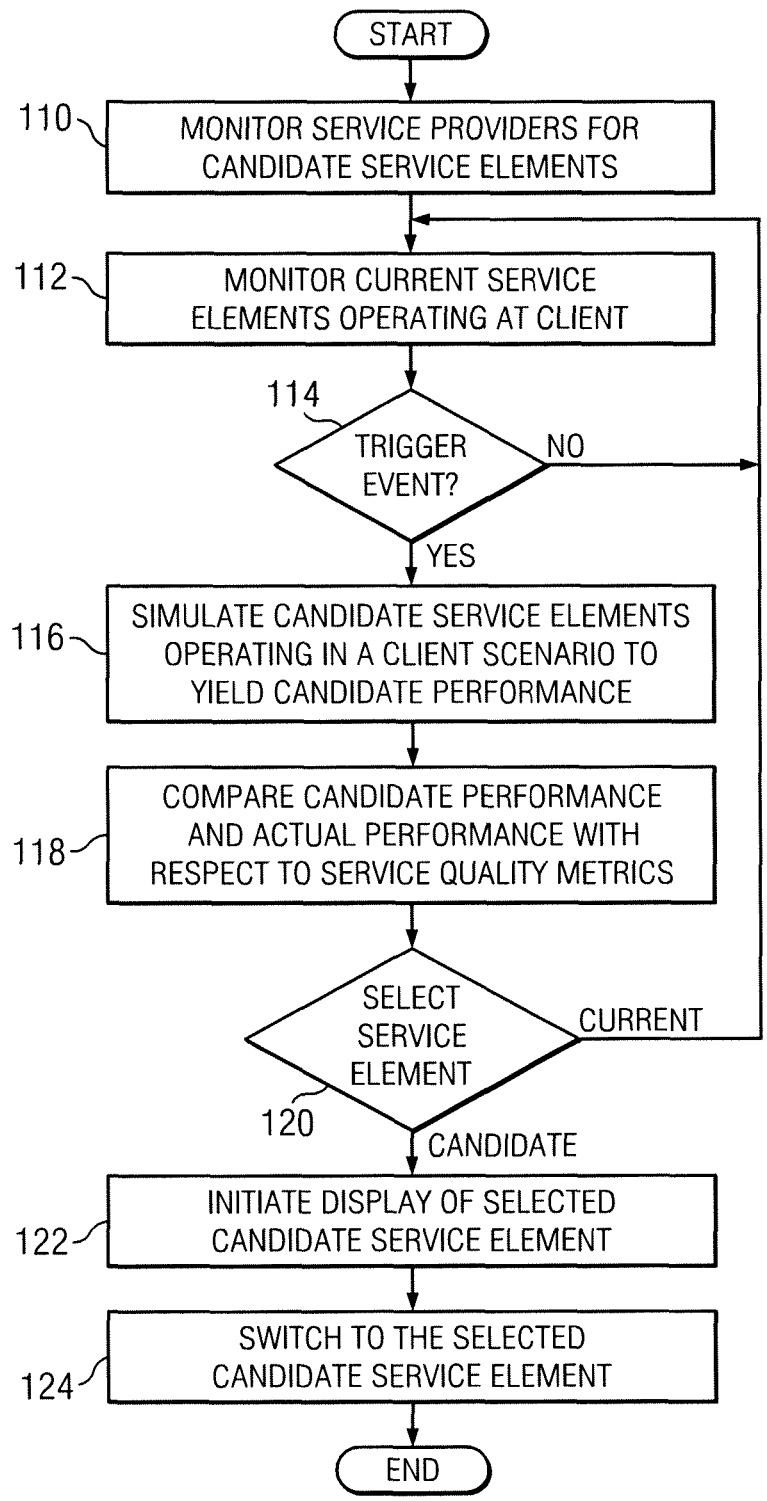
FIG. 2 illustrates an example of a method for recommending candidate service elements that provide a service to replace current service elements that provide the service.

Embodiments of the present invention and its advantages are best understood by referring to FIGS. 1 and 2 of the drawings, like numerals being used for like and corresponding parts of the various drawings.

FIG. 1 illustrates an example of a system 10 that includes a recommendation system 20 that may recommend candidate service elements that provide a service to replace current service elements that may provide the service for a client 22. In certain embodiments, the candidate service elements may be evaluated with respect to the current service elements. In certain embodiments, recommendation system 20 may simulate performance of the candidate service elements operating for client 22. In certain embodiments, recommendation system 20 may monitor service providers to discover candidate service elements that may replace the current service elements.

In the illustrated example, system 10 includes recommendation system 20, client 22, one or more service providers 24, and a communication network 26 coupled as shown. Client 22 may include and/or be operated on by one or more service elements 30 of one or more services provided by one or more service providers 24. Recommendation system 20 may include an interface (IF) 40, logic 42, and one or more memories 44. Logic 44 may include one or more processors 50 and applications such as a monitor 52, a simulator 54, and an analyzer 56. Memory 44 may store information such as metrics 60 with thresholds 62 and the applications of logic 42.

In certain examples of operation, recommendation system 20 monitors one or more current service elements 30 that can provide a service for client 22. Recommendation system 10 detects a trigger event associated with a current service element 30. Recommendation system 10 analyzes one or more candidate service elements with respect to the current service elements 30 operating for client 22 while the candidate service elements are operating in a client scenario corresponding to the client 22.

Service providers 24 may provide any suitable services to client 22. Examples of services include IT services (such as a user authentication service) and business services (such as an online banking service).

In certain embodiments, the service may be provided by a set of one or more service elements 30 that operate together to provide the service. Any suitable service element may be used. For example, a service element 30 may be a basic network and/or telecommunications service element, which may be bundled with other service elements to provide a service. In certain embodiments, a service element 30 may interact with other elements 30. For example, a service element 30 may request service from, may provide service to, may activate, or may be activated by another service element 30.

A current service element 30 may refer to a service element 30 that can provide the service for client 22. For example, current service element 30 may be currently operating for client 22, may have operated for client 22 in the past, or may be dormant. A candidate service element may refer to a service element that recommendation system 20 is considering as a replacement for a current service element 30. In certain embodiments, a service element may be designated as replaceable or irreplaceable. A replaceable service element is a service element that can be replaced by a candidate service element, and an irreplaceable service element is one that cannot be replaced.

In certain embodiments, a service level agreement may designate requirements that a service or a service element should satisfy. For example, an overall service level agreement may designate the overall service level for a service, and an element service level agreement may designate an element service level for a service element.

In certain embodiments, a service level agreement may designate the requirements using service quality metrics 60 and service quality thresholds 62 that the service or service element should satisfy. A service quality metric is a metric that may be measured to yield a metric value used to determine service quality. A service quality threshold is a threshold that a measured metric value should satisfy. A threshold 62 may be defined as a maximum threshold, a minimum threshold, or a point threshold. A value may satisfy a maximum threshold if the value is less than the maximum threshold. A value may satisfy a minimum threshold if the value is greater than the minimum threshold. A value may satisfy a point threshold if the value is equal to the threshold. In certain embodiments, a threshold may be associated with an action to be performed if a measured metric value fails to satisfy a threshold. Any suitable action may take place if a measured metric value fails to satisfy a threshold. For example, a notification may be sent if the measured metric value fails to satisfy a threshold.

Any suitable service metrics may be used. In certain embodiments, the service metrics may be given by a service measurement index (SMI) framework. In certain embodiments, the metrics may include agility, risk, security, cost, quality, and capability metrics. Agility metrics may measure awareness/visibility, flexibility (such as portability and replaceability), adaptability, and capacity/elasticity. Risk metrics may measure provider ability (such as business stability, certifications, contract/SLA verification, supply chain, and ethicality), compliance (such as auto ability), and human resource abilities. Security metrics may measure physical and environmental, communications and operations, axis control, and data security (such as policy, geographic/political, ownership, privacy data logs, and integrity). Cost may measure acquisition and ongoing costs.

Quality metrics may measure serviceability (such as maintainability, supportability, and service continuity), availability (such as reliability, stability, and resiliency/fault tolerance), functionality (such as suitability, accuracy, testability, interruptability, and transparency), effectiveness (such as value), efficiency, (such as service response time and sustainability), usability (such as installability, learnability, operability, and understandability), and contracting experience. Capability metrics may measure different capabilities of the system.

An overall service level of a service may be specified in an overall service level that covers the service or may be determined from element service level agreements of the set of service elements 30 that provide the service. The overall service level may be determined in any suitable manner. For example, the overall service level may be the service level of the element service level agreement that provides the lowest quality service. As another example, the element service levels may be weighted according to the participation of their corresponding service elements in the service. The overall service level may be determined from a mathematical function (such as average) applied to the weighted element service levels.

Monitor 52 monitors current service elements 30 for trigger events associated with current service elements 30. Monitor 52 may also monitor service providers 24 for candidate service elements that may be recommended to replace certain current service elements 30.

Monitor 52 may monitor events of client 22. Examples of events may include receiving a message (such as a notification), receiving data (by, for example, pushing or pulling), detecting a change (such as a initiation, modification, or termination) of a computer process, and detecting a change in input or output. Monitor 52 may perform any suitable monitoring action on events, for example, filtering redundant events; collecting, normalizing, formatting, validating, and storing events; and changing information of events (such as adding information to, modifying, or removing information from events).

In certain embodiments, an event may be drawn from one or more other events. For example, an event may be generated in response to metrics determined from other events. For example, individual metrics may be gathered and a mathematical function (for example, a sum or average) may be applied to the metrics to generate an event.

In certain embodiments, monitor 52 may detect a trigger event. A trigger event may be any suitable event. For example, a trigger event may occur when a measured metric value fails to satisfy a threshold. For example, the cost of a service may go above a maximum cost threshold. As another example, a trigger event may occur when a request for candidate service elements is received. The request may come from a user or from an automated computer system. As yet another example, a trigger event may be a periodic event. For example, recommendation system 20 may be set up to periodically recommend candidate service elements.

In certain embodiments, monitor 52 may operate according to embodiments disclosed in U.S. patent application Ser. No. 12/553,416, titled "System and Method for Performing Complex Event Processing", filed Sep. 3, 2009, which is incorporated herein by reference.

Simulator 54 estimates candidate performance of candidate service elements. In certain embodiments, simulator 54 simulates operation of the candidate service elements in a client scenario to yield candidate performance. Simulator 54 may simulate the operation in any suitable manner. In certain embodiments, simulator 54 runs the candidate service elements in a simulation that uses the parameters of a client scenario. A client scenario may include parameters that describe features of client 22. The parameters may be used to simulate the operation of a candidate service element in client 22. The parameters may describe any suitable features of client 22, for example, availability level of a service, performance of a service (such as speed of response), and cost of a service. A client scenario includes features of a particular client 22, and different clients 22 may have different client scenarios.

In certain embodiments, simulator 54 predicts candidate performance of the candidate service elements operating for the client. For example, simulator 54 may obtain past data and a trend analysis of the same or similar service. The data may be obtained from past monitoring in some cases. Simulator 54 may then apply the trend analysis to the past data to yield a prediction. As another example, simulator 54 may determine candidate performance from an outside source. For example, simulator 54 may obtain results of a survey on performance of the candidate service or may obtain an opinion from someone who has evaluated the service.

In certain embodiments, simulator 54 may operate according to embodiments disclosed in U.S. patent application Ser. No. 12/725,859, titled "System and Method for Evaluating and Selecting Software Components and Services", which is incorporated herein by reference.

In certain embodiments, analyzer 56 analyzes one or more candidate service elements with respect to the current service elements 30. In certain embodiments, analyzer 56 compares the candidate performance and the actual performance with respect to service quality metrics. In certain embodiments, service quality metrics of an overall service level may be used. Accordingly, a set of service elements that provides a better overall service level may be identified.

Analyzer 56 may select either the candidate or the actual performance as the better performance in any suitable manner. For example, a candidate performance may be better than the actual performance if the candidate metric values are better than the actual metric values. In certain embodiments, candidate metric values may be regarded as better than the actual metric values only if the improvement is greater than a given percentage. For example, a candidate metric value is better than a actual metric value if the candidate metric value is greater than or equal to an x % improvement, where x is a value in the range of less than 5%, 5 to 10%, or 10 to 20%. Other restrictions may apply when determining if the service element should be changed. For example, a limit may be placed on the maximum amount of current service elements that may be changed to candidate service elements.

As an example of the operation of analyzer 50, analyzer 50 may analyze hosting services. The current service elements may have threshold for, for example, CPU power. A measured metric value of the current service elements may be a current cost. A candidate hosting service element may offer a CPU power that satisfies the CPU power threshold, and may have a candidate cost that is less than the current cost. Accordingly analyzer 56 may recommend the candidate service element.

As another example, analyzer 56 may analyze bundled services. Current service elements 22 may include x separate images and/or services that are not bundled. A candidate service element may offer the same images and/or services in a bundle for a candidate cost that is less than the current cost. Analyzer 56 may recommend uninstalling the separate images and/or services, terminating the contract for the separate services and/or images, and establishing a new contract for the bundled images and/or services.

As another example, a set of current service elements 30 may include a high performance service element. The high performance service element may have high performance attributes, for example, a high data rate, but also may have a higher cost. The set may also include low performance service elements with low performance attributes, for example, a low data rate. Accordingly, the overall service level of the set may be regarded as low. Analyzer 56 may determine that the high performance service element is not worth the high price, and may recommend replacing the high performance service element with a candidate low performance service element.

In certain embodiments, analyzer 56 may analyze the service elements with respect to the trigger event. For example, if the trigger event resulted from a measured metric value that failed to satisfy a threshold, analyzer 56 may determine if the candidate service elements satisfy the threshold. In certain embodiments, analyzer 56 may instruct monitor 52 to search for certain candidate service elements, for example, candidate service elements that satisfy a threshold that is no longer satisfied by the current service element.

In certain embodiments, analyzer 56 may operate according to embodiments disclosed in U.S. patent application Ser. No. 12/553,416, titled "System and Method for Performing Complex Event Processing", filed Sep. 3, 2009, and U.S. patent application Ser. No. 12/728,616, titled "Hybrid Software Component and Service Catalog", filed Mar. 22, 2010, which are incorporated herein by reference.

FIG. 2 illustrates an example of a method for recommending candidate service elements that provide a service to replace current service elements that can provide the service to client 22. Monitor 52 monitors one or more service providers at step 110. In certain embodiments, monitor 52 may identify one or more candidate service elements from the monitoring.

Monitor 52 monitors current service elements 30 operating for client 22 at step 112. Monitoring a current service element 30 may yield actual metric values that describe actual performance of the current service element 30. The actual metric values may be metric values measured while current service element 30 is operating for client 22.

Monitor 52 may detect a trigger event associated with a current service element 30 at step 114. A trigger event may be any suitable event. For example, a trigger event may occur when a measured metric value fails to satisfy a threshold. As another example, a trigger event may occur when a request for candidate service elements is received. As another example, a trigger event may be a periodic event that occurs periodically to recommend candidate service elements.

In certain embodiments, steps 116 through 120 describe analyzing candidate service elements with respect to current service elements 30. Simulator 54 determines candidate performance of the candidate service elements in a client scenario to yield candidate performance at step 116. A client scenario may describe features of client 22 that may be used to estimate candidate performance of a candidate service element operating for client 22. In certain embodiments, simulator 54 simulates operation of the candidate service elements in a client scenario to yield candidate performance at step 116. In certain embodiments, simulator 54 predicts candidate performance of the candidate service elements operating for client 22.

Analyzer 56 compares the candidate performance and the actual performance with respect to service quality metrics at step 118. A service quality metric is a metric that may be measured to determine service quality. In certain embodiments, service quality metrics of an overall service level may be used.

A service element is selected at step 120. A service element may be selected in any suitable manner. If the candidate performance is better than the actual performance, the candidate service element may be selected and the method proceeds to step 122. If the actual performance is better than the candidate performance, the current service element may be selected and the method returns to step 112.

Display of the selected service element is initiated at step 122. Display may be initiated in any suitable manner. For example, system 10 may send instructions to a display device to display the service element. The display may include any suitable information. For example, the display may include the selected service element and, in certain cases, may include other recommended service elements.

Client 22 is switched to the selected service element at step 124. In certain embodiments, client 22 may be automatically switched to the selected service element. That is, the switch may occur without any user intervention. In other embodiments, client 22 may be switched to the selected service element only after a user has instructed the switch to occur.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of monitor 52 and simulator 54 may be performed by one component, or the operations of recommendation system 20 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   monitoring, using one or more processors, a managed information technology service provided to a client, the managed service comprising a plurality of current service elements, the plurality of current service elements operating to provide the managed service to the client;
   detecting, using the one or more processors, an event associated with the managed service;
   analyzing one or more candidate service elements, wherein the analysis is based on each of the one or more candidate service elements operating with a subset of the plurality of current service elements in a client scenario corresponding to the client;
   automatically deciding, based on the analysis, to switch from at least one of the plurality of current service elements to at least one candidate service element of the one or more candidate service elements and automatically switching, using the one or more processors, to the at least one candidate service element;
   displaying at a graphical user interface, to the client, the at least one candidate service element and a plurality of alternative ones of the candidate service elements;
   wherein the subset of the plurality of current service elements comprises a current service element that is not switched to the at least one candidate service element; and
   wherein the subset of the plurality of current service elements comprises an irreplaceable service element.

2. The method of claim 1, the analyzing one or more candidate service elements comprising:
   performing a simulation of a candidate service element of the one or more candidate service elements operating with one or more of the plurality of current service elements in the client scenario to yield candidate performance;
   monitoring a current service element of the plurality of current service elements operating to provide the managed service to yield actual performance; and
   comparing the candidate performance and the actual performance.

3. The method of claim 1, the analyzing one or more candidate service elements comprising:
   predicting candidate performance of a candidate service element of the one or more candidate service elements operating with one or more of the plurality of current service elements in the client scenario;
   determining actual performance of a current service element of the plurality of current service elements operating to provide the managed service; and
   comparing the predicted candidate performance with the actual performance.

4. The method of claim 1, the analyzing one or more candidate service elements comprising:
   evaluating a candidate service element of the one or more candidate service elements with respect to one or more service quality metrics.

5. The method of claim 1, the detecting an event comprising:
   determining that a measured metric value has failed to satisfy a threshold.

6. The method of claim 1, comprising:
   monitoring one or more service providers; and
   identifying the one or more candidate service elements in response to the monitoring.

7. The method of claim 1, comprising:
   initiating display of a candidate service element of the one or more candidate service elements.

8. One or more non-transitory computer-readable media, when executed by one or more processors, configured to:

monitor a managed information technology service provided to a client, the managed service comprising a plurality of current service elements, the plurality of current service elements operating to provide the managed service to the client;

detect, using the one or more processors, an event associated with the managed service;

analyze one or more candidate service elements, wherein the analysis is based on the one or more candidate service elements operating with a subset of the plurality of current service elements in a client scenario corresponding to the client;

automatically decide, based on the analysis, to switch from at least one of the plurality of current service elements to at least one candidate service element of the one or more candidate service elements and automatically switch to the at least one candidate service element;

display at a graphical user interface, to the client, the at least one candidate service element and a plurality of alternative ones of the candidate service elements;

wherein the subset of the plurality of current service elements comprises a current service element that is not switched with the at least one candidate service element; and wherein the subset of the plurality of current service elements comprises an irreplaceable service element.

9. The media of claim 8, the analyzing one or more candidate service elements comprising:
performing a simulation of a candidate service element of the one or more candidate service elements operating with one or more of the plurality of current service elements in the client scenario to yield candidate performance;
monitoring a current service element of the plurality of current service elements operating to provide the managed service to yield actual performance; and
comparing the candidate performance and the actual performance.

10. The media of claim 8, the analyzing one or more candidate service elements comprising:
predicting candidate performance of a candidate service element of the one or more candidate service elements operating with one or more of the plurality of current service elements in the client scenario;
determining actual performance of a current service element of the plurality of current service elements operating to provide the managed service; and
comparing the predicted candidate performance with the actual performance.

11. The media of claim 8, the analyzing one or more candidate service elements comprising:
evaluating a candidate service element of the one or more candidate service elements with respect to one or more service quality metrics.

12. The media of claim 8, the detecting an event comprising:
determining that a measured metric value has failed to satisfy a threshold.

13. The media of claim 8, configured to:
monitor one or more service providers; and
identify the one or more candidate service elements in response to the monitoring.

14. The media of claim 8, configured to:
initiate display of a candidate service element of the one or more candidate service elements.

15. An apparatus comprising:
a memory configured to store information; and
one or more processors configured to:
monitor a managed information technology service provided to a client, the managed service comprising a plurality of current service elements, the plurality of current service elements operating to provide the managed service to the client;
detect, using the one or more processors, an event associated with the managed service;
analyze one or more candidate service elements, wherein the analysis is based on the one or more candidate service elements operating with a subset of the plurality of current service elements in a client scenario corresponding to the client;
automatically decide, based on the analysis, to switch from at least one of the plurality of current service elements to at least one candidate service element of the one or more candidate service elements and automatically switch to the at least one candidate service element;
display at a graphical user interface, to the client, the at least one candidate service element and a plurality of alternative ones of the candidate service elements;
wherein the subset of the plurality of current service elements comprises a current service element that is not switched to the at least one candidate service element; and
wherein the subset of the plurality of current service elements comprises an irreplaceable service element.

16. The method of claim 1, wherein a managed service comprises an information technology service.

17. The method of claim 1, the analyzing one or more candidate service elements comprising:
determining a candidate service level of a candidate service element of the one or more candidate service elements operating with one or more of the plurality of current service elements in the client scenario, the candidate service level comprising a candidate service quality metric; and
determining whether the candidate service quality metric satisfies a service quality threshold designated by a service level agreement ("SLA"),
wherein automatically deciding to switch from at least one of the plurality of current service elements to at least one candidate service element comprises automatically deciding to switch from at least one of the plurality of current service elements to the candidate service element associated with the candidate service level in response to determining that the candidate service quality metric satisfies the service quality threshold.

18. The method of claim 17, wherein the candidate service quality metric is an agility metric relating to a portability of the candidate service element associated with the candidate service level.

19. The method of claim 17, wherein the candidate service quality metric is a security metric relating to an environmental security of the candidate service element associated with the candidate service level, wherein the environmental security is associated with a geographic location.

* * * * *